United States Patent Office 3,575,688
Patented Apr. 20, 1971

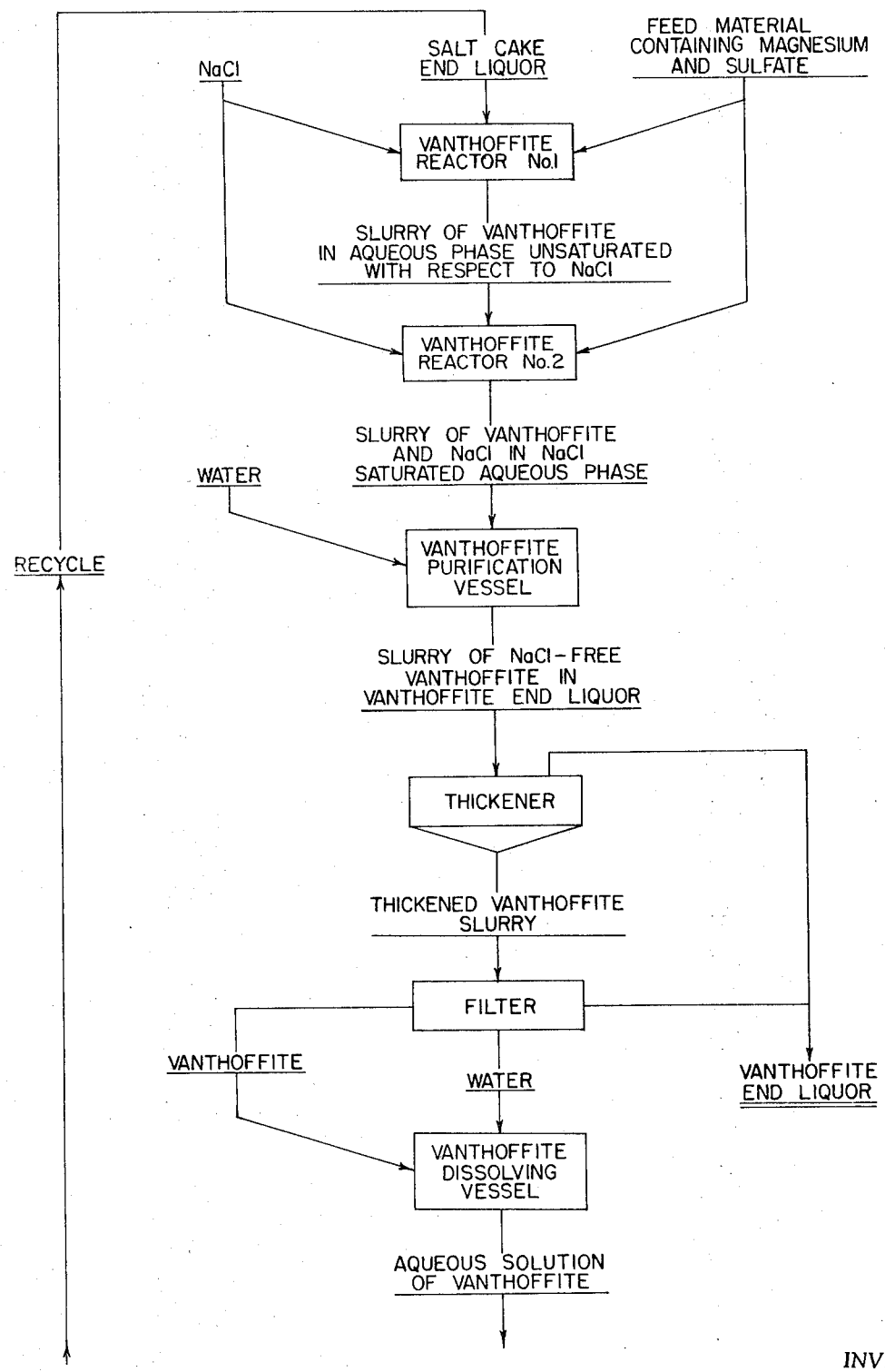

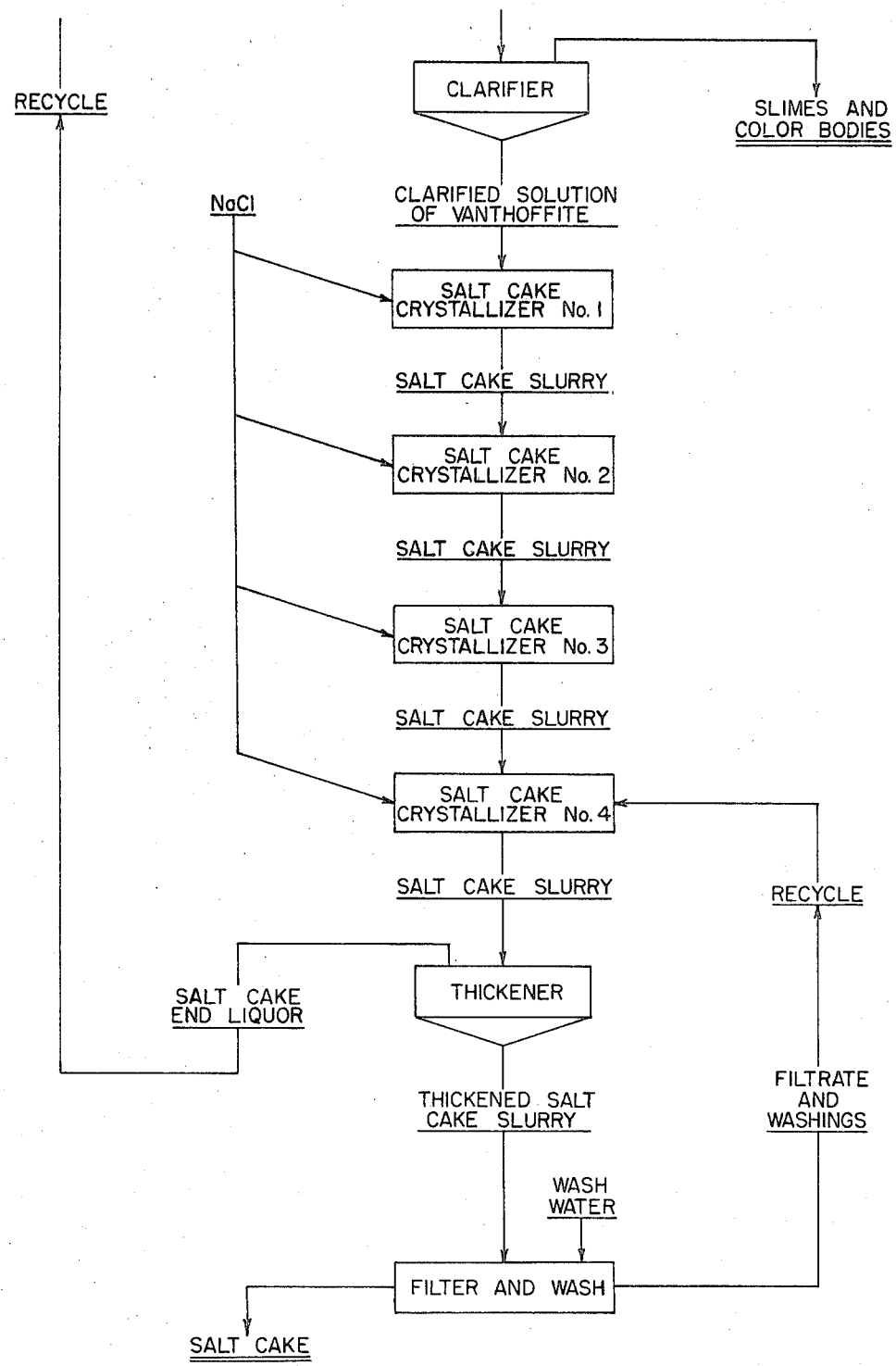

3,575,688
PRODUCTION OF HIGH-QUALITY SALT CAKE VIA VANTHOFFITE
Ulrich E. G. Neitzel and Jerome A. Lukes, Ogden, Utah, assignors to Great Salt Lake Minerals & Chemicals Corporation, New York, N.Y.
Filed Feb. 5, 1969, Ser. No. 796,802
Int. Cl. C01d 5/10
U.S. Cl. 23—121
16 Claims

ABSTRACT OF THE DISCLOSURE

Vanthoffite is produced by reacting sodium chloride with mineral material containing magnesium and sulfate in two, sequentially arranged, reaction zones. The composition of the aqueous phase in the first zone is maintained in the vanthoffite region of the phase diagram descriptive of the system. In the second zone, the magnesium chloride concentration is increased to the region of the phase diagram where vanthoffite is metastable, but a sufficient concentration of vanthoffite crystals is maintained in this zone to insure continued vanthoffite formation. The vanthoffite is dissolved, and the resulting solution is clarified and fed through a series of reactors with sequentially increasing concentrations of sodium chloride to produce high-quality sodium sulfate.

BACKGROUND OF THE INVENTION

Field

The invention relates to the production of salt cake from materials containing magnesium sulfate minerals and sodium chloride. Specifically, it provides an improved process for the production of salt cake via vanthoffite as an intermediate species.

STATE OF THE ART

The conventional approach for producing salt cake ($Na_2SO_4$) is to first produce Glauber salt and then to dehydrate the Glauber salt to produce anyhdrous $Na_2SO_4$. Although the use of Glauber salt as an intermediate results in high-quality salt cake, the heating and cooling requirements for the process are very high. The heating requirement of the dehydration step may be avoided by "salting out" procedures whereby the Glauber salt is dissolved and sodium chloride is added to the resulting solution to force out anhydrous $Na_2SO_4$. The salt cake produced in this fashion, however, has been of an undesirably small crystal size.

To avoid both the cooling and heating requirements of the Glauber salt process, several alternative intermediate products; principally, magnesium sodium sulphate species, such as astrakanite, vanthoffite, and d'ansite; have been suggested. None of these processes has gained commercial success, however, because of difficulties encountered in obtaining a clean intermediate of satisfactory crystal size. For example, although vanthoffite should be a good intermediate from the standpoint of its chemical composition, containing a very desirable ratio of $Na_2SO_4$ to $MgSO_4$, it characteristically crystallizes from solution as extremely fine crystals and is thus difficult to separate from brine entrainment.

German Pa. No. 406,555 discloses a process for the production of vanthoffite from kieserite ($MgSO_4 \cdot H_2O$) and NaCl by reacting these materials in water at high temperatures. The vanthoffite is converted to sodium sulfate by contacting it with NaCl and water at 100° C. to produce anhydrous sodium sulfate and a liquor which contains sodium, magnesium, chloride, and sulfate in appropriate quantities for recycle for the production of additional vanthoffite.

German Pat. No. 421,325 discloses a similar process for the production of vanthoffite which takes particular advantage of the characteristic of vanthoffite to crystalize as very fine crystals for the separation of vanthoffite from kieserite and NaCl impurities by classification. The vanthoffite recovered in this fashion must then be purified by being converted first to thenardite, containing 96 to 98 percent $Na_2SO_4$, or by cooling to produce Glauber salt. The conversion of vanthoffite to thenardite is done by leaching at a temperature of about 35 to about 40° C.

French Pat. No. 1,462,702 discloses a process for producing vanthoffite by reacting $MgSO_4$, as epsomite and NaCl in water at a temperature of about 75° C. The reaction is initiated at a temperature higher than 105° C. to avoid the crystallization of other double salts of magnesium and sodium, such as astrakanite, loewite, or d'ansite, until a seed bed of vanthoffite crystals is obtained. Thereafter, the reaction is conducted under conditions at which vanthoffite is metastable. Thus, substantially all of the vanthoffite formed by the process is subject to conversion to other species.

U.S. Pat. No. 2,952,515 discloses a process for the production of vanthoffite from either magnesium sulfate or potassium magnesium double sulfate by reacting the same in water with NaCl at a temperature between 30 and 80° C. According to that patent, the magnesium content and the chloride content of the solution are controlled so that the end liquor contains no more than 5 parts of magnesium and no more than 30 parts of chloride for each 100 parts of water, it being essential to the invention there disclosed that both magnesium and chloride be introduced to the reaction in amounts which exceed their allowable concentrations in a solution saturated with respect to vanthoffite.

The sodium sulfate produced via vanthoffite by the salting-out procedures disclosed in the literature is of very fine crystal size and is often difficult to filter and separate from brine entrainment.

SUMMARY OF THE INVENTION

The present invention provides an improved proecss for the production of salt cake using vanthoffite as an intermediate species. It further provides an improving salting-out procedure for the production of high-quality salt cake of improved crystal size, purity and color.

According to the present invention, vanthoffite is produced by reacting NaCl with minerals which contain magnesium and sulfate, such as the hydrated magnesium sulfates, in two separate reaction zones arranged for sequential flow from the first zone to the second zone.

The composition of the aqueous phase contained by the first reactor is established and maintained such that the only stable, sodium sulfate-containing, solid phase in equilibrium with the aqueous phase is vanthoffite, the concentrations of magnesium, sodium, and sulfate being sufficiently high to insure the crystallization of vanthoffite. The temperature within the reactor is maintained below about 110° and above about 80° C., preferably between about 85 and about 100° C. A natural consequence of the reaction is the production of $MgCl_2$. The concentration of $MgCl_2$ in the aqueous phase of the slurry contained in the first reaction zone thus tends to increase and would eventually exceed the permissible concentration for the stable vantoffite field of the phase diagram descriptive of the system if the total reaction were allowed to proceed to completion in this zone. Accordingly, the reaction is conducted in the first zone under conditions which avoid increasing the $MgCl_2$ concentration beyond a pre-established "safe" limit, generally below about 12 moles per 1000 moles $H_2O$. This control may be accomplished by apportioning the feed materials to the first zone to limit the amount of $MgCl_2$ that can be produced by their complete reaction. Alternatively, the slurry produced in the first reaction zone may be withdrawn at a rate which maintains the $MgCl_2$ concentration below the prescribed level. If desired in a particular instance, both procedures may be combined.

Although it is possible to conduct the reaction in the first zone under conditions of NaCl saturation, it is preferred that the aqueous phase be slightly undersaturated with respect to NaCl. The rate of reaction between the feed materials appears to be significantly faster when the aqueous phase is undersaturated with respect to NaCl, particularly when magnesium and/or sulfate minerals which contain sodium, e.g., astrakanite ($Na_2SO_4 \cdot MgSO_4 \cdot 4H_2O$), are fed to the reaction. In any event, excess NaCl is generally avoided.

A slurry of vanthoffite in an aqueous solution, usually containing less than the saturated concentration of NaCl, is transferred to the second reaction zone. Sufficient additional NaCl and magnesium- and sulfate-containing minerals are introduced to the second zone to produce additional vanthoffite. It is usually desired to produce an NaCl-saturated liquor in the second reaction zone to maximize the total amount of vanthoffite produced. Thus, some NaCl may remain undissolved in the effluent from the second reactor, although the residence time and NaCl concentration in this reactor may be adjusted to ensure dissolution of substantially all of the solid NaCl.

As has been disclosed hereinbefore, all of the feed materials may be introduced to the first reaction zone and a slurry may be withdrawn from that zone before the reaction is complete so that the additional feed materials are introduced to the second zone slurried with the vanthoffite from the first zone. It is usually preferred to split the total feed between the two zones, however, such that the maximum permissible portion of the total reaction, as determined by the permissible $MgCl_2$ concentration in the aqueous phase, is completed in the first zone. The second zone then receives only enough additional feed materials to complete the reaction. Feed to the first and second zones is thus normally proportioned so that a major amount, typically in excess of about 60 percent of the total vantoffite produced, is produced in the first reactor. It is then possible to establish solution concentrations in the second reactor as high as 25 moles or more $MgCl_2$ per 1000 moles $H_2O$ without initiating the crystallization of any sodium sulfate species other than vanthoffite.

A particular benefit of the present invention is its ability to produce vanthoffite in the loewite field, even in the presence of potassium. Available feed materials often contain minor amounts of potassium-containing minerals. Those derived from brine often carry brine entrainment which includes dissolved potassium. Potassium tends to promote the formation of loewite in the loewite field of the phase diagram where vanthoffite is metastable. It has been found, however, that potassium ion concentrations as high as 16 moles per 1000 moles of $H_2O$ are tolerable in the second reaction zone of this invention without serious adverse affects.

Of course, either reaction zone may include a plurality of individual reactors arranged for either series or parallel flow, or any desired combination thereof.

A slurry of vanhoffte in admixture with some NaCl is withdrawn from the second reaction zone and is introduced to a vanthoffite-purification vessel together with sufficient water to dissolve any solid NaCl present. A slurry of NaCl-free vanthoffite in vanthoffite end liquor is withdrawn from this vessel and the vanthoffite is recovered, by filtration or otherwise, from the end liquor. It is within the ordinary skill of the industry to control the purification procedure to dissolve all of the NaCl without dissolving any vanthoffite. Any temperature at which vanthoffite is stable; e.g., about 50 to about 110° C. may be maintained in the purification vessel. Temperatures above 60° are preferred.

The vanthoffite produced by the foregoing procedure is of relatively large crystal size, typically containing less than about 15 percent by weight of particles finer than 200 mesh. It will usually be in admixture with insoluble slimes introduced with the sulfate materials fed to the process, as well as with any color bodies which may be introduced with the slimes or picked up in the reactors. Because of the large crystal size of the vanthoffite material, it may be recovered relatively free from entrained end liquor; i.e., it will usually contain less than about 10 to about 15 percent by weight brine entrainment.

Because of the low NaCl content of the crystal crop, the vanthoffite may be dissolved in water at any convenient temperature below about 110° C. to produce a clean aqueous solution of sodium sulfate. The solution may be clarified or filtered to remove substantially all slimes and other insoluble material so that the clarified vanthoffite solution is substantially free from solid impurities.

The combined procedures of first dissolving NaCl; recovering the vanthoffite; dissolving the vanthoffite; and clarifying the resulting sodium sulfate solution constitute an important preferred feature of this invention. By following this sequence of steps, there is produced a maximum quantity of $Na_2SO_4$ dissolved in a minimum quantity of water in a solution substantially free from unwanted insoluble impurities. If the NaCl were not separately dissolved and removed, it would depress the solubility of $Na_2SO_4$, and additional water would be required to completely dissolve the vanthoffite, thereby decreasing the eventual yield of salt cake from the process.

To produce high-grade salt cake, the clarified $Na_2SO_4$ solution is contacted with NaCl in a series of crystallizers to force salt cake from solution. Unlike the procedures of the prior art, NaCl saturation is avoided in each of the crystallizers. Thus, according to the claimed invention, the $Na_2SO_4$ salting-out reaction is not necessarily brought to completion. It has been found that salt cake of superior crystal size is produced by avoiding NaCl saturation, even in the last crystallizer.

Although it is possible to saturate the salt cake mother liquor in the last reactor with NaCl to increase the yield of salt cake, it is preferred to recycle the salt cake end liquor to the vanthoffite reactor while it is still unsaturated with respect to NaCl. According to this invention, salt cake meeting specifications at least as stringent as those met by the commercial products produced by the dehydration of Glauber salt is produced by flowing the clarified $Na_2SO_4$ solution through a plurality of crystallizers while maintaining a progressively higher concentration of NaCl in the effluent from each successive crystallizer, taking care to avoid NaCl saturation, preferably even in the last crystallizer. The solution temperature in each crystallizer is maintained above about 30° C., preferably between about 35 and 45° C. for reasons of economy, although temperatures in excess of 100° C. are feasible. In the last crystallizer, any solid NaCl in suspension with the salt cake is dissolved so that salt cake of high purity is produced. Thus, the chloride content in the last crystallizer is desirably held below about 13 percent by weight.

DESCRIPTION OF THE DRAWINGS

The drawing is a flow sheet illustrating a preferred embodiment of what is presently considered to be the best mode for carrying out the invention.

DESCRIPTION OF THE ILLUSTRATED EMBODIMENT

Feed materials containing magnesium and sulfate minerals are introduced to a first vanthoffite reactor together with sufficient NaCl and recycled salt cake end liquor to produce a vanthoffite crystal crop slurried in an aqueous phase of composition such that vanthoffite is the stable solid sodium sulfate species in equilibrium therewith. The magnesium-and sulfate-containing crystal crop may be from any convenient source, such as a mined deposit or a crystal crop produced by the evaporation of brines. Although the precise chemical composition of the magnesium-and sulfate-containing crystal crop may be varied widely, it should be made up principally of magnesium and sulfate minerals, preferably as magnesium sulfate hydrates or other minerals containing magnesium sulfate combined with sodium or potassium salts, notably the chloride or sulfate salts. The feed material will inevitably contain slimes and often contains color bodies, such as organic materials present in the brines from which the materials were derived, but it should be substantially free from soluble constituents other than sulfate, sodium, chloride, magnesium, and potassium. Feed materials which contain, for each mole of Mg, about 0.8 to about 2.5 moles $SO_4$, up to about 0.4 mole K, up to about 2 moles Cl, a balancing amount of Na, and only inconsequential amounts of other soluble materials, are suitable for use. By "balancing amount of Na" is means the stoichiometric quantity required to balance total cations with total anions in the feed material.

The composition of salt cake end liquor is less variable because it is produced by dissolving sodium chloride in an aqueous solution of vanthoffite, as described in more detail hereinafter. Accordingly, the end liquor will contain dissolved NaCl, $Na_2SO_4$, and $MgSO_4$ in amounts determined by the relative proportions of vanthoffite and NaCl in the aforesaid reaction. Other constituents; e.g., KCl, will be present in very minor amounts, rarely in excess of about 0.5 percent by weight. Usually, the recycled salt cake end liquor will contain about 80 to about 96 moles of NaCl, about 3 to about 6 moles of $Na_2SO_4$, and about 12 to about 17 moles of $MgSO_4$ for each 1000 moles of $H_2O$.

The magnesium-and sulfate-containing feed materials, the salt cake end liquor, and NaCl are mixed in proportions which produce an aqueous phase (or liquor) composition of about 10 to about 13 moles $MgCl_2$ per 1000 moles $H_2O$, the liquor being slightly unsaturated with respect to NaCl, i.e., containing about 4 to about 10 fewer moles NaCl than the saturated concentration thereof. The temperature of the liquor within the reactor is maintained within the range of about 85 to about 100° C.

A slurry of vanthoffite in vanthoffite-reactor-1 effluent liquor is continuously transferred from reactor 1 to a second vanthoffite reactor wherein it is mixed with additional sulfate feed material and additional NaCl. There results an aqueous phase saturated with respect to NaCl and containing from about 15 to about 20 moles $MgCl_2$ per 1000 moles $H_2O$. As a result, additional vanthoffite crystals are produced in reactor 2, usually in admixture with some NaCl. The liquor and solids from vanthoffite reactor 2 are transferred to a vanthoffite-purification vessel wherein just sufficient water is admixed with the slurry to dissolve any NaCl which might be present. The resulting slurry of NaCl-free vanthoffite in vanthoffite end liquor is introduced to a thickener. The thickened vanthoffite slurry underflow from the thickener is filtered to separate the solid vanthoffite from the vanthoffite end liquor. The vanthoffite end liquor, comprising the thickener overflow and the filtrate, is discarded from the process. This end liquor contains commercially valuable amounts of magnesium, sulfate, and sometimes potassium. Thus, it may be used as feed material to other recovery processes.

The vanthoffite crystal crop, which still contains about 5 to about 15 percent by weight entrained brine of the composition of the vanthoffite end liquor and which may contain up to 10 percent or more by weight slimes and some grade-depreciating color bodies, is transferred to a vanthoffite-dissolving vessel wherein it is contacted with just sufficient water to produce an aqueous solution saturated with respect to sodium sulfate. The aqueous solution is clarified to remove slimes and color bodies and is then introduced to a series of salt cake crystallizers.

The salt cake crystallizers are operated at about 40° C. and at sequentially increasing NaCl concentrations to force $Na_2SO_4$ from solution. Thus, sufficient NaCl is added to each successive crystallizer to maintain the chloride concentration at about 6 to about 7 weight-percent, based upon the total weight of the aqueous phase, in the first crystallizer; and corresponding concentrations of about 8 to about 10 weight-percent in the second crystallizer, about 11 to about 13 weight-percent in the third crystallizer, and the desired end concentration in the fourth crystallizer. Thus, in the fourth crystallizer, the chloride concentration is kept below the sodium chloride-saturation level, usually about 12.9 weight percent at temperatures between about 35 and about 45° C. The residence time of the material in the fourth reactor is sufficient to insure that any solid NaCl is substantially completely dissolved. In this fashion, chemically high-grade $Na_2SO_4$ is produced.

A typical salt cake product produced by this invention contains in excess of 99.5 percent by weight $Na_2SO_4$ and less than 0.1 percent by weight Cl. Its crystal size is comparable or better than presently available products of commerce, 80 percent by weight +200 mesh being representative.

Table 1 reports a typical material balance for the process illustrated by the drawing.

Reference herein to details of certain specific embodiments is not intended to limit the claims, which themselves recite those features regarded as essential to the invention.

TABLE 1.—TYPICAL MATERIAL BALANCE

| Description from drawing | Component | Quantity, mole part units [1] | Aqueous phase, composition in moles per 1,00 moles H₂O | | | | | Solid phase, moles | Water, moles |
|---|---|---|---|---|---|---|---|---|---|
| | | | $MgSO_4$ | $Na_2SO_4$ | $MgCl_2$ | $K_2Cl_2$ | $Na_2Cl_2$ | | |
| Location: | | | | | | | | | |
| Feed to vanthoffite reactor No. 1 | Magnesium-sulfate feed materials | 0.19 | 129 | 18 | | 21 | 60 | | 190 |
| | Water | | | | | | | | 98.8 |
| | NaCl | | | | | | | 18.8 | |
| | Salt Cake end liquor (from salt cake crystallizer No. 4) | 0.72 | 14.4 | 6 | | 0.4 | 44 | | 720 |
| Feed to vanthoffite reactor No. 2 | Vanthoffite from reactor No. 1 | | | | | | | 6.6 | |
| | Reactor No. 1 effluent liquor | 1.01 | 16 | | 12 | 4 | 40 | | 10.10 |
| | Magnesium-sulfate feed material | 0.05 | 129 | 18 | | 21 | 60 | | 50 |
| | NaCl | | | | | | | 0.28 | |
| Feed to vanthoffite purification vessel | Vanthoffite from reactor No. 2 | | | | | | | 8.5 | |
| | Reactor No. 2 effluent liquor | 1.06 | 15 | | 16 | 5.1 | 36.5 | | 1,060 |
| | Water | 0 | | | | | | 0 | (Nil) |
| Feed to vanthoffite dissolving vessel | Vanthoffite from purification vessel | | | | | | | 8.5 | |
| | Entrainment | 0.06 | 15 | | 16 | 5.1 | 36.5 | | 60 |
| | Water | | | | | | | | 500 |
| Feed to salt cake crystallizer No. 1 | Filtered effluent from vanthoffite dissolving vessel | 0.56 | 18.5 | 44.1 | | 0.5 | 5.5 | | 560 |
| | NaCl | | | | | | | 14 | |
| Feed to salt cake crystallizer No. 2 | $Na_2SO_4$ from crystallizer No. 1 | | | | | | | 8.4 | |
| | Crystallizer No. 1 effluent liquor | 0.56 | 18.5 | 29 | | 0.5 | 18 | | 560 |
| | NaCl | | | | | | | 13.3 | |
| Feed to salt cake crystallizer No. 3 | $Na_2SO_4$ from crystallizer No. 2 | | | | | | | 15.7 | |
| | Crystallizer No. 2 effluent liquor | 0.56 | 18.5 | 16 | | 0.5 | 29 | | 560 |
| | NaCl | | | | | | | 15.7 | |
| Feed to salt cake crystallizer No. 4 | $Na_2SO_4$ from crystallizer No. 3 | | | | | | | 23 | |
| | Crystallizer No. 3 effluent liquor | 0.56 | 18.5 | 3 | | 0.5 | 43 | | 560 |
| | NaCl | | | | | | | 21.4 | |
| | Recycle wash water [2] | 0.161 | | | | | | | 61 |
| Output | $Na_2SO_4$ | | | | | | | 20.3 | |
| | Vanthoffite end liquor | 1 | 15 | | 16 | 5.1 | 36.5 | | 1,000 |

[1] One "mole part unit" is that quantity of any brine which contains 1,000 moles of water.
[2] Composition of the aqueous phase is variable, depending on washing conditions, and is not reported because it is unnecessary for a complete material balance.

We claim:

1. A process for making vanthoffite which comprises: introducing to a first reaction zone feed materials containing water, $Mg^{++}$, $SO_4^=$, Cl and $Na^+$ in proporportions to produce a slurry of solid vanthoffite in an aqueous solution while maintaining the concentration of $MgCl_2$ in said solution within the range, below about 13 moles per 1000 moles $H_2O$, that vanthoffite is the stable solid sulfate phase at equilibrium;

transferring said slurry of vanthoffite in said aqueous solution to a second reaction zone;

establishing the composition of said slurry in said second reaction zone so that the aqueous phase of said slurry is concentrated with respect to NaCl and the $MgCl_2$ concentration is higher than its permissible concentration, above 12 moles per 1000 moles $H_2O$, in the stable vanthoffite field of the phase diagram descriptive of the system, but sufficient solid vanthoffite is present to promote additional vanthoffite formation;

maintaining said adjusted composition in the second reaction zone to produce additional vanthoffite, and recovering vanthoffite from said second reaction zone.

2. The process of claim 1, wherein the concentration of $MgCl_2$ in the first reaction zone is maintained between about 10 and about 13 moles per 1000 moles $H_2O$ and the concentration of $MgCl_2$ in the second reaction zone is maintained above about 15 moles per 1000 moles $H_2O$.

3. The process of claim 1, wherein a slurry containing both solid vanthoffite and solid NaCl is withdrawn from the second reaction zone; is contacted with water to dissolve the NaCl therefrom; and substantially NaCl-free vanthoffite is recovered.

4. The process of claim 3, wherein the recovered solid vanthoffite substantially free from NaCl is dissolved and clarified to produce a clean solution free from slimes.

5. The process of claim 1 wherein a portion of the feed materials sufficient to produce an aqueous phase containing between about 10 and about 13 moles $MgCl_2$ per 1000 moles $H_2O$ is introduced to the first reaction zone and the remainder of the feed materials is introduced directly to the second reaction zone.

6. The process of claim 5 wherein at least about 60 weight percent of the feed materials is added to the first reaction zone.

7. A process for making vanthoffite which comprises:

feeding $MgSO_4$-containing material, NaCl, and water to a first reaction zone in proportions to produce a first vanthoffite crystal crop and a first vanthoffite mother liquor which is unsaturated with respect to NaCl and which contains no more than about 12 moles $MgCl_2$ per 1000 moles $H_2O$, feeding said first vanthoffite crystal crop, said first vanthoffite mother liquor, $MgSO_4$-containing material, NaCl, and water to a second reaction zone in proportions to produce a second vanthoffite crystal crop and a second vanthoffite mother liquor saturated with respect to NaCl and containing at least 12 moles $MgCl_2$ per 1000 moles $H_2O$; and recovering substantially NaCl-free vanthoffite.

8. The process of claim 7, wherein the concentration of $MgCl_2$ in the second vanthoffite mother liquor is maintained above about 15 moles per 1000 moles $H_2O$.

9. The process of claim 7, wherein a slurry of vanthoffite and NaCl in said second vanthoffite mother liquor is recovered from the second reaction zone;

the vanthoffite and NaCl are recovered and contacted with just sufficient water to dissolve the NaCl, thereby to form a slurry of vanthoffite; and the vanthoffite is recovered from said slurry and contacted with just sufficient water to dissolve the vanthoffite, thereby to form an aqueous solution saturated with respect to $Na_2SO_4$.

10. In the process for producing sodium sulfate by contacting an aqueous solution of vanthoffite with NaCl to cause the crystallization of solid $Na_2SO_4$ therefrom, the improvement which comprises feeding such a solution through a plurality of successive zones, and effecting crystallization in each said zone while avoiding conditions of NaCl-saturation in each of said zones.

11. The improvement of claim 10, wherein the said aqueous solution is initially saturated with respect to $Na_2SO_4$ at a temperature between about 35 and about 45° C.; sufficient NaCl is dissolved in said solution in a first zone at said temperature to establish a concentration of between about 6 and about 7 weight-percent chloride, thereby to cause the crystallization of $Na_2SO_4$ until the chloride concentration of the aqueous phase of the slurry is increased up to about 13 weight-percent; and the $Na_2SO_4$ is recovered from the slurry.

12. The improvement of claim 11, wherein the final chloride ion concentration of the aqueous phase of the slurry is between about 11 and about 13 weight-percent.

13. The improvement of claim 10, wherein the chloride ion concentration of the aqueous phase is maintained in successive crystallization zones at between about 6 to about 7, about 8 to about 10, and about 11 to about 13 weight-percent, respectively.

14. The improvement of claim 13, wherein the slurry resulting in the third crystallization zone is transferred to a fourth crystalllization zone and is held therein for sufficient duration to allow substantially all of any NaCl contained in the solid phase to dissolve, but the water content of the aqueous phase is controlled so that the chloride ion concentration of said aqueous phase is maintained below about 12.9 weight-percent.

15. The process for producing salt cake which comprises:
   introducing water, recycled salt cake mother liquor, and feed materials containing Mg, and for each mole of Mg, about 0.8 to about 2.5 moles $SO_4$, up to about 0.4 mole K, up to about 2 moles Cl, and a balancing amount of Na, to a first reaction zone operating at between about 80 and about 110° C. in proportions to produce a slurry of solid vanthoffite in an aqueous solution containing between about 10 and about 13 moles $MgCl_2$ per 1000 moles $H_2O$;
   introducing slurry from the first reaction zone and additional feed materials of the aforedescribed composition to a second reaction zone operating at between about 80 and about 110° C. in proportions to produce additional vanthoffite and result in an aqueous phase at equilibruim saturated with respect to NaCl and containing between about 15 and about 20 moles $MgCl_2$ per 1000 moles $H_2O$ and a solid phase including both vanthoffite and NaCl;
   recovering said solid phase;
   contacting said solid phase with water at a temperature between about 50 and about 100° C. to dissolve the NaCl;
   recovering the remaining vanthoffite;
   contacting said remaining vanthoffite with just sufficient water to dissolve it, thereby to form a solution substantially saturated with respect to $Na_2SO_4$;
   clarifying said solution of $Na_2SO_4$ to remove any insoluble impurities;
   contacting the clarified $Na_2SO_4$ solution with NaCl to force solid $Na_2SO_4$ from solution while avoiding saturating said solution with respect to NaCl; and
   recovering the solid $Na_2SO_4$.

16. The process of claim 15, wherein
   the temperatures in the first and second reaction zones are held between about 85 and about 100° C.;
   the NaCl concentration in the aqueous phase of the first reaction zone is held below its saturated concentration;
   the solid phase recovered from the second reaction zone is contacted with just sufficient water at a temperature above about 60° C. to dissolve the NaCl without dissolving a significant amount of the vanthoffite; and
   the saturated $Na_2SO_4$ solution is contacted with NaCl in a plurality of successive crystallization zones operating at temperatures between about 35 and about 45° C., the NaCl concentration being maintained sequentially higher in successive zones but below the saturated concentration of NaCl in each said zone.

References Cited

UNITED STATES PATENTS

| 2,125,624 | 8/1938 | Davis et al. | 23—121 |
| 2,567,968 | 9/1951 | Saeman | 23—302 |
| 2,952,515 | 9/1960 | Dancy | 23—121 |

FOREIGN PATENTS

| 145,059 | 2/1952 | Austrial | 23—1 |
| 216,621 | 3/1922 | Canada | 23—121 |

OTHER REFERENCES

Perry, J. H. et al.: Chemical Engineers Handbook; 4th edition; McGraw-Hill Book Co.; N.Y., 1963, pp. 17-4 to 17-17 and 17-11 to 17-12.

OSCAR R. VERTIZ, Primary Examiner

G. O. PETERS, Assistant Examiner